United States Statutory Invention Registration [19]

[11] Reg. Number: H69

Appell et al. [45] Published: Jun. 3, 1986

[54] SOLVENT TREATMENT OF COAL FOR IMPROVED LIQUEFACTION

[75] Inventors: Herbert R. Appell, Pitcairn; Nand K. Narain, Bethel Park; Bruce R. Utz, Pittsburgh, all of Pa.

[73] Assignee: The United States of America as represented by the United States Department of Energy, Washington, D.C.

[21] Appl. No.: 795,302

[22] Filed: Nov. 6, 1985

Related U.S. Application Data

[63] Continuation of Ser. No. 587,422, Mar. 8, 1984.

[51] Int. Cl.[4] ..... C10G 1/00; C10B 49/02; C10B 53/04

[52] U.S. Cl. ..... 208/418; 208/403; 208/430; 208/431; 208/435; 201/2.5

*Primary Examiner*—John F. Terapane

*Assistant Examiner*—Eric Jorgensen

*Attorney, Agent, or Firm*—Hugh W. Glenn; Robert J. Fisher; Judson R. Hightower

[57] ABSTRACT

Increased liquefaction yield is obtained by pretreating a slurry of solid carbonaceous material and a liquid hydrocarbonaceous solvent at a temperature above 200° C. but below 350° C. for a period of 10 minutes to four hours prior to exposure to liquefaction temperatures.

5 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SOLVENT TREATMENT OF COAL FOR IMPROVED LIQUEFACTION

ORIGIN OF THE INVENTION

This invention was made by applicants during the course of their work as employees of the United States Department of Energy at the Pittsburgh Energy Technology Center.

This is a continuation of application Ser. No. 587,422 filed Mar. 8, 1984.

BACKGROUND OF THE INVENTION

This invention relates to processes for converting solid carbonaceous material to a carbonaceous liquid, and more particularly, to a pretreatment procedure for increasing liquefaction yield in such processes.

Solid carbonaceous material such as coal, coke, peat, shale, wood, etc., can be converted to a carbonaceous liquid by contact with a hydrocarbonaceous liquid solvent in the presence of a source of hydrogen at a temperature in excess of 350° C. but not more than about 475° C. Often the liquefaction product or an intermediate liquid stream in the process is recycled for use as the liquid solvent. A slurry of the solid carbonaceous material, such as coal, and the solvent is rapidly preheated to liquefaction temperatures and maintained at such temperature in the presence of hydrogen for periods of varying from 5 minutes to several hours.

It is known that temperatures above 350° C. are required before any significant breakage of coal compound bonds and liquefaction of solid coal material occurs. Thus, it has long been believed that temperatures of at least 350° C. were required to promote the liquefaction of coal. Such temperatures permit cleavage of carbon to carbon bonds for hydrogenation and the formation of lower molecular weight material with increased H/C ratio. Consequently, it has been common practice in prior processes to heat the coal, or other carbonaceous material, rapidly to a temperature of 350° C. or higher on commencement of heating.

Various approaches have been taken in an attempt to increase liquefaction yield. Some prior processes have used two stage liquefaction, but with both stages carried out at temperatures above 350 ° C. However, the high temperatures rapidly obtained permit pyrolysis reaction within the coal before the solvent penetrates the fine pore structure. In other prior art processes, a slurry of the coal in powdered form and the solvent was heated in a storage or process feed tank to a temperature of 150° C. or lower, prior to being subjected to liquefaction conditions. Tests have shown that temperatures of 150° C. or lower are ineffective in increasing liquefaction of carbonaceous material in any reasonable period of time.

OBJECTS AND SUMMARY OF THE INVENTION

It has been found that yields of liquefaction product can be increased by pretreating a slurry of solid carbonaceous material and a hydrocarbonaceous solvent at below normal liquefaction temperatures to permit solvent incorporation and/or swelling of the solid carbonaceous material prior to liquefaction.

In accordance with the present invention, there is provided in a solvation method for the liquefaction of carbonaceous material wherein the material is contacted by a liquid hydrocarbonaceous solvent and a source of hydrogen at a liquefaction temperature of at least 350° C. for a period of about 5 to 30 minutes, the improvement which comprises pretreating said carbonaceous material in contact with said solvent at a temperature greater than 160° C. but not more than 350° C. for a period of ten minutes to four hours.

DESCRIPTION OF PREFERRED EMBODIMENT

Numerous liquefaction processes are well known in the art for converting solid carbonaceous material, such as coal, coke, shale, wood, etc. to a carbonaceous liquid. A preferred liquefaction process employs the solvation method wherein the solid carbonaceous material is contacted by a hydrogen donor solvent and then subjected to the liquefaction stage. In accordance with the present invention, increased liquefaction yield is obtained by pretreating a slurry of solid carbonaceous material and a liquid hydrogen donor solvent at a temperature about 200° C. but below liquefaction temperatures for a specific period prior to exposing the slurry to liquefaction temperatures.

For purposes of illustration, the invention is described with reference to liquefaction of coal, but this is not intended as a limitation on application of the invention. Examples of coal which exhibit improved liquefaction yields when pretreated in accordance with the present invention include Wyodak (100 mesh), W. Kentucky 9/14 high volatile bituminous (200 mesh) and Bruceton high volatile A bituminous coal (Pittsburgh Seam). Suitable solvents include hydrogenated creosote oil, SRC-II heavy distillate, 1-methylnaphthalene or quinoline, depending upon the product distribution desired.

In carrying out one such process including the improved pretreatment step according to the present invention, solid coal in powdered form is mixed with a hydrogen donor solvent forming a slurry in a solvent-to-coal ratio of 1:1 to 5:1 by weight.

The slurry is preheated at a temperature at least 200° C. but not more than 350° C., and preferably in the range of 200° C. to 300° C., for a period of 10 minutes to four hours, and preferably 15 minutes to one hour. The shorter times apply to the higher temperatures and the longer times apply to the lower temperatures. This pretreatment allows swelling and opening of the carbonaceous solids to receive solvent liquid into contact with internal solid portions that might otherwise be pyrolized to coke or other high carbon solids by rapid dry exposure to liquefaction temperatures. The preheating may be carried out prior to application of hydrogen gas, or the coal, solvent and hydrogen may be preheated prior to the liquefaction stage. This solvent pretreatment of the coal at below normal liquefaction temperatures prior to liquefaction results in significant increases in yield and liquefaction selectivity.

The pretreated slurry is then subjected to liquefaction which may be carried out in the manner known in the art. The slurry is introduced into a dissolver or reactor, pressurized with hydrogen to a pressure between about 1000 and 3000 psig, preferably between about 1100 and 2000 psig, and heated to liquefaction temperatures of 350° C. and higher. Preferably the liquefaction temperature is in the range of 350° C. to 475° C. to maximize the amount of coal dissolved while minimizing the amount of gaseous products formed. Higher liquefaction temperatures could be used depending upon the product distribution desired. A portion of the liquefaction product is recycled for use as the solvent.

A set of experiments was conducted to determine the effect of preheat treatment and/or solvent incorporation on liquefaction yield. Bruceton high-volatile A bituminous coal (Pittsburgh Seam) and W. Kentucky 9/14 high-volatile B bituminous coal (200 mesh), stored in an inert atmosphere, were used in the experiments. Distilled quinoline, 1-methylnaphthalene, a mixture of 90% 1-methylnaphthalene and 10% quinoline, Koppers creosote oil, or SRC-II heavy distillate were the chosen vehicles for these experiments. An in situ solvent treatment was part of the preheating phase of these experiments.

In the first set of experiments, Bruceton coal was treated with quinoline at a temperature of 200° C. or with 1-methylnaphthalene at a temperature of 200° C. A slurry of solvent and coal in a solvent-to-coal ratio of 5:1 was charged to a microautoclave, pressured with hydrogen to 1100 psig, and heated and held for one hour at a temperature of 200° C. to permit solvent incorporation to occur. The temperature was then rapidly raised to 425° C. and maintained at this temperature for fifteen minutes for a liquefaction test. The experiments were run without a catalyst for liquefaction, but a suitable catalyst could be used.

At the end of the fifteen minute liquefaction test period, the temperature was lowered. Conversion was measured by the product solubility in tetrahydrofuran in cyclohexane and in ethyl acetate.

The product was removed with tetrahydrofuran (THF) and filtered by the pressure filtration method. The dry residue was used to calcuate conversion to THF-solubles on a maf basis. The filtrate was placed in a rotary evaporator to remove the THF. Five mL of THF was returned to the flask, and the solution was dripped into 150 mL of cyclohexane.

The precipitate (preasphaltenes plus asphaltenes) was collected via filtration. The filtrate containing the cyclohexane solubles (CH) was placed in a rotary evaporator and brought to constant weight to recover the oil. In these experiments, ethyl acetate solubles (EA) were also determined. The THF extract was poured into ethyl acetate; the mixture was filtered to collect the preasphaltenes; and the concentrated solution was poured into cyclohexane. The results of these tests are shown in Table I.

TABLE I

Effect of Preheat Treatment on Coal Liquefaction (15 min., 425 ° C., 1100 psig initial $H_2$ pressure, 1 g Bruceton coal, 5 g solvent)

| Solvent[a] | in situ Pretreatment | Conversion (%) THF Sol. | EA Sol. | CH Sol. |
|---|---|---|---|---|
| Q | None | 40 | 4 | −45 |
| Q | 1 hr. at 200° C. | 73 | 43 | 15 |
| MeN | None | 50 | 35 | 20 |
| MeN | 1 hr. at 200° C. | 60 | 45 | 28 |

[a]Q = quinoline, MeN = 1-methylnaphthalene.

A comparison of these results with corresponding data obtained without the one-hour preheating step is shown in Table I. The data show significant improvements in total conversion, as measured by the solubilities of the products in tetrahydrofuran, ethyl acetate, and cyclohexane. The effect of the preheat period is especially striking with quinoline because this is an excellent coal solvent, a strong adduct former, and a powerful swelling agent. A lengthy preheat period may be important for quinoline in order to break up the gel-like mass that forms when hot quinoline is absorbed by coal.

A second set of experiments was run to determine the general applicability of pretreatment with solvent to short contact time liquefaction with two other solvents. A series of runs was made with Bruceton and W. Kentucky 9/14 coals and two typical coal solvents—Koppers creosote oil and SRC II heavy distillate.

The solvent-to-coal ratio was 5:1. The coal and solvent were charged to a microautoclave, heated to a temperature of 200° C. and then held for one hour at a temperature of 200° C. An additional run of W. Kentucky 9/14 coal was made for a shorter pretreatment time of 15 minutes at a higher temperature of 320° C.

Following preheating, the temperature was raised to 425° C. in one minute and maintained at this temperature for a specified time and under an initial pressure of 2000 psig. The run time for the Bruceton coal at liquefaction temperature was 15 minutes while that for the W. kentucky 9/14 coal was 5 minutes. After the specified run time, the coal-solvent slurry was cooled to below 200° C. in less than 15 seconds in a cold water quench, and conversion was measured by the product solubility in tetrahydrofuran. The results of these tests are shown in Table II.

TABLE II

Effect of Solvent Pretreatment (1 g coal, 5 g solvent, 2000 psig, 425° C.)

| Coal | Solvent | Pretreatment | Run Time | THF Sol. (%) |
|---|---|---|---|---|
| Bruceton | Creos. Oil | None | 15 min. | 61.5 |
| Bruceton | Creos. Oil | 1 hr. at 200° C. | 15 min. | 66.7 |
| Bruceton | SRC-II, H.D. | None | 15 min. | 75.6 |
| Bruceton | SRC-II, H.D. | 1 hr. at 200° C. | 15 min. | 78.2 |
| W. KY 9/14 | SRC-II, H.D. | None | 5 min. | 85.7 |
| W. KY 9/14 | SRC-II, H.D. | 1 hr. at 200° C. | 5 min. | 88.1 |
| W. KY 9/14 | SRC-II, H.D. | 15 min. at 320° C. | 5 min. | 88.2 |
| W. KY 9/14 | Creos. Oil | None | 5 min. | 79.5 |
| W. KY 9/14 | Creso. Oil | 1 hr. at 200° C. | 5 min. | 81.8 |

The results indicate that an improved yield was obtained in all cases even for short heating times at liquefaction temperatures by preheating the coal-solvent slurry at a temperature below normal liquefaction temperatures. There appeared to be no difference in an hour preheating time at a temperature of 200° C. and a 15 minute period at a temperature of 320° C. The use of SRC-II heavy distillate as the solvent resulted in an appreciably higher conversion than when the solvent was creosote oil. The beneficial effect of the solvent pretreatment was attributed to swelling of the coal and also penetration of the pore structure of the coal with solvent prior to reaching liquefaction temperatures. This is especially important in short contact time liquefaction, where pyrolysis reactions may occur within the coal particle before the solvent can penetrate the fine pore structure and assist in obtaining selective liquefaction.

A third set of experiments was conducted using W. Kentucky 9/14 coal and SRC-II heavy distillate as the solvent. In the third set of experiments, the coal, solvent, and hydrogen were charged to a microautoclave, heated to an held at the desired preheat time, cooled to room temperature and then raised to the reaction temperature in about 60 seconds and held there for five minutes. The coal-solvent slurry was cooled between the preheat period and the reaction period in this set of experiments in order to make the actual liquefaction step the same in all cases. Conversion was measured by the product solubility in tetrahydrofuran (THF).

The liquefaction tests were conducted in the short contact time (SCT) liquefaction mode. The pretreated coal-solvent slurry was heated to liquefaction temperature (425° C.) in a one minute heat up time, and held at this temperature for five minutes. Then the slurry was cooled to below 200° C. in less than 15 seconds in a cold water quenching bath. The results of these experiments are summarized in Table III.

TABLE III

Effect of Solvent Pretreatment (1 g coal, 5 g solvent, 2000 psig, 425° C.)

| Coal | Solvent | Pretreatment | Run Time | THF Sol. (%) |
|---|---|---|---|---|
| W. KY 9/14 | SRC-II, H.D. | None | 5 min. | 85.7 |
| W. KY 9/14 | SRC-II, H.D. | 3 hrs. at 160° C. | 5 min. | 85.7 |
| W. KY 9/14 | SRC-II, H.D. | 3 hrs. at 200° C. | 5 min. | 88.3 |

A comparison of the results of these experiments with those summarized in Table II, which were conducted using W. Kentucky 9/14 coal and SRC-II as the solvent, indicate there is little difference in the results obtained for a three hour heating at 200° C. and the results obtained for shorter time, 1 hour at a lower temperature 320° C. However, these tests demonstrate that there was no benefit in preheating the slurry at 160° C. for 3 hours.

A fourth set of experiments was conducted using 1 gram of Wyodak coal and a solvent consisting of 4 grams 1-methylnaphthalene and 1 gram quinoline. This set of experiments was conducted in the manner of the experiments summarized in Table III, and show the beneficial effect of preheating a solvent-coal slurry of Wyodak coal and 1-methylnaphthalene/quinoline solvent on liquefaction yield. The results of these experiments are summarized in Table IV.

TABLE IV

Effect of Solvent Pretreatment (1 g coal, 5 g solvent, 2000 psig, 425° C.) Solvent 4 g 1-methylnaphthalene, 1 g quinoline

| Coal | Pretreatment | Run Time | THF Solubles (%) |
|---|---|---|---|
| Wyodak | None | 5 min. | 47.6 |
| Wyodak | 1 hour ar 300° C. | 5 min. | 52.1 |

The embodiments of the invention in which an exclusive property or privilege is claimed are defined as follows:

1. In a solvation method for the liquefaction of carbonaceous material wherein the material is contacted with a hydrocarbonaceous liquid solvent in the presence of a source of hydrogen gas in a single liquefaction stage at a liquefaction temperature of at least 350° C. for a period of about 5 to 30 minutes, and a portion of the liquefaction product from the liquefaction stage is recycled for use as at least a portion of the liquid solvent, the improvement comprising: pretreating said carbonaceous material in contact with the hydrocarbonaceous liquid solvent in a preheater stage at a temperature of at least about 200° C. but not more than about 350° C. for a period of ten minutes to four hours to allow swelling of the carbonaceous material and penetration of the pore structure of the carbonaceous material with the hydrocarbonaceous liquid solvent prior to application of hydrogen gas and exposure to temperatures in excess of 350° C. in the presence of the hydrocarbonaceous liquid solvent in the liquefaction stage, said solvent is selected from the group consisting of hydrogenated creosote oil, SRC-II heavy distillate, 1-methylnaphthalene, and quinoline.

2. The method according to claim 1, wherein the liquefaction is conducted at a temperature of 350 ° C. to 475° C. and under a pressure of 1000 psig to 2500 psig.

3. The method according to claim 1, wherein the carbonaceous material is heated in contact with the liquid solvent to a temperature of about 200° C. to 300° C. for approximately 1 hour.

4. The method according to claim 1, wherein the hydrocarbonaceous liquid solvent and the carbonaceous material in powdered form are mixed together to form a slurry, the ratio by weight of hydrocarbonaceous liquid solvent to carbonaceous material being about 5:1.

5. In a solvation method for the liquefaction of a solid carbonaceous material wherein the material is heated in slurry with a hydrocarbonaceous liquid solvent in the presence of a source of hydrogen gas in a single liquefaction stage at a liquefaction temperature of 350° to 475° C. for a period of about 5 to 30 minutes to form a liquefaction product, and a portion of the liquefaction product is recycled as at least a portion of the hydrocarbonaceous liquid solvent, the improvement comprising: pretreating the slurry of the carbonaceous material and the hydrocarbonaceous liquid solvent at a temperature of at least about 200° C. but not more than about 350° C. for a period of ten minutes to four hours and with a weight ratio of solvent to carbonaceous material of 1:1 to 5:1 to allow swelling of the carbonaceous material and penetration of the pore structure of the carbonaceous material with the hydrocarbonaceous liquid solvent prior to application of hydrogen gas and exposure to temperatures in excess of 350° C. in the presence of hyrocarbonaceous liquid solvent in the liquefaction stage, said solvent is selected from the group consisting of hydrogenated creosote oil, SRC-II heavy distillate, 1-methylnaphthalene, and quinoline.

* * * * *